United States Patent
Lee et al.

(10) Patent No.: US 11,515,522 B2
(45) Date of Patent: Nov. 29, 2022

(54) POSITIVE ELECTRODE ACTIVE MATERIAL FOR SECONDARY BATTERY, METHOD OF PREPARING THE SAME, AND LITHIUM SECONDARY BATTERY INCLUDING THE POSITIVE ELECTRODE ACTIVE MATERIAL

(71) Applicant: LG Chem, Ltd., Seoul (KR)

(72) Inventors: Dong Hun Lee, Daejeon (KR); Young Uk Park, Daejeon (KR); Wang Mo Jung, Daejeon (KR); Sung Bin Park, Daejeon (KR); Dong Hwi Kim, Daejeon (KR); Tae Gu Yoo, Daejeon (KR)

(73) Assignee: LG Energy Solution, Ltd.

(*) Notice: Subject to any disclaimer, the term of this patent is extended or adjusted under 35 U.S.C. 154(b) by 278 days.

(21) Appl. No.: 16/770,820

(22) PCT Filed: Feb. 1, 2019

(86) PCT No.: PCT/KR2019/001473
§ 371 (c)(1),
(2) Date: Jun. 8, 2020

(87) PCT Pub. No.: WO2019/151834
PCT Pub. Date: Aug. 8, 2019

(65) Prior Publication Data
US 2020/0388830 A1 Dec. 10, 2020

(30) Foreign Application Priority Data
Feb. 1, 2019 (KR) .................. 10-2018-0013114

(51) Int. Cl.
*H01M 4/36* (2006.01)
*H01B 1/08* (2006.01)
*C01G 53/00* (2006.01)
*H01M 4/505* (2010.01)
*H01M 4/525* (2010.01)
*H01M 10/0525* (2010.01)
*H01M 4/02* (2006.01)

(52) U.S. Cl.
CPC ............ *H01M 4/364* (2013.01); *C01G 53/50* (2013.01); *H01B 1/08* (2013.01); *H01M 4/505* (2013.01); *H01M 4/525* (2013.01); *H01M 10/0525* (2013.01); *C01P 2002/60* (2013.01); *C01P 2004/53* (2013.01); *C01P 2004/61* (2013.01); *C01P 2004/62* (2013.01); *C01P 2006/40* (2013.01); *H01M 2004/021* (2013.01); *H01M 2004/028* (2013.01)

(58) Field of Classification Search
CPC ........ H01B 1/08; H01M 4/505; H01M 4/525; H01M 4/36; C01G 53/50
See application file for complete search history.

(56) References Cited

U.S. PATENT DOCUMENTS

| | | |
|---|---|---|
| 2006/0263691 A1 | 11/2006 | Park et al. |
| 2010/0081055 A1 | 4/2010 | Konishi et al. |
| 2012/0141874 A1 | 6/2012 | Jang et al. |
| 2014/0038052 A1 | 2/2014 | Song et al. |
| 2014/0050985 A1 | 2/2014 | Lee et al. |
| 2014/0227599 A1 | 8/2014 | Nishide et al. |
| 2015/0249248 A1 | 9/2015 | Ishizaki et al. |
| 2017/0227221 A1 | 8/2017 | Park et al. |
| 2017/0346133 A1* | 11/2017 | Je .................... H01M 4/366 |
| 2017/0365844 A1* | 12/2017 | Ito .................... H01M 4/366 |
| 2018/0145322 A1* | 5/2018 | Choi ................. H01M 4/505 |
| 2018/0175388 A1* | 6/2018 | Han ................... H01M 4/131 |
| 2018/0219212 A1 | 8/2018 | Seol et al. |
| 2018/0241036 A1 | 8/2018 | Jo et al. |
| 2018/0294477 A1 | 10/2018 | Shin et al. |
| 2019/0013545 A1* | 1/2019 | Kim ................. H01M 4/505 |
| 2019/0190060 A1* | 6/2019 | Chevrier ........... H01M 10/058 |
| 2020/0335783 A1* | 10/2020 | Lee .................. H01M 4/366 |
| 2022/0102731 A1* | 3/2022 | You ................. H01M 4/661 |
| 2022/0149350 A1* | 5/2022 | Jung ............... H01M 10/0525 |

FOREIGN PATENT DOCUMENTS

| | | |
|---|---|---|
| CN | 101339991 A | 1/2009 |
| CN | 103782423 A | 5/2014 |
| CN | 107636866 A | 1/2018 |
| EP | 2169745 A1 | 3/2010 |
| EP | 2733776 A1 | 5/2014 |
| EP | 2882014 A1 | 6/2015 |
| JP | 4972624 B2 | 7/2012 |
| JP | 2013065468 A | 4/2013 |
| JP | 2013218787 A | 10/2013 |
| JP | 2015026594 A | 2/2015 |
| KR | 20120061432 A | 6/2012 |
| KR | 20140024587 A | 3/2014 |
| KR | 20150073969 A | 7/2015 |
| KR | 20150081938 A | 7/2015 |
| KR | 20160049995 A | 5/2016 |
| KR | 20170063373 A | 6/2017 |
| KR | 20170069153 A | 6/2017 |
| WO | 2014061653 A1 | 4/2014 |

OTHER PUBLICATIONS

Axmann et al "Tailoring high-voltage and high-performance LiNi0.5Mn1.5O4 cathode material for high energy lithium-ion batteries", Journal of Power Sources 301 (2016) 151-159.*
International Search Report for PCT/KR2019/001473 dated May 10, 2019; 2 pages.
Extended European Search Report including Written Opinion for Application No. EP19747241.8 dated Dec. 14, 2020, 7 pages.

* cited by examiner

*Primary Examiner* — Mark Kopec
(74) *Attorney, Agent, or Firm* — Lerner, David, Littenberg, Krumholz & Mentlik, LLP

(57) ABSTRACT

A positive electrode active material for a secondary battery includes a first positive electrode active material and a second positive electrode active material, wherein an average particle diameter ($D_{50}$) of the first positive electrode active material is twice or more than an average particle diameter ($D_{50}$) of the second positive electrode active material, and the second positive electrode active material has a crystallite size of 200 nm or more.

20 Claims, No Drawings

POSITIVE ELECTRODE ACTIVE MATERIAL FOR SECONDARY BATTERY, METHOD OF PREPARING THE SAME, AND LITHIUM SECONDARY BATTERY INCLUDING THE POSITIVE ELECTRODE ACTIVE MATERIAL

CROSS-REFERENCE TO RELATED APPLICATIONS

This application is a national phase entry under 35 U.S.C. § 371 of International Application No. PCT/KR2019/001473, filed Feb. 1, 2019, which claims priority to Korean Patent Application No. 10-2018-0013114, filed Feb. 1, 2018, the disclosures of which are incorporated herein by reference.

TECHNICAL FIELD

The present invention relates to a positive electrode active material for a secondary battery, a method of preparing the same, and a lithium secondary battery including the positive electrode active material.

BACKGROUND ART

Recently, with the rapid spread of electronic devices using batteries, such as mobile phones, notebook computers, and electric vehicles, demand for secondary batteries with relatively high capacity as well as small size and lightweight has been rapidly increased. Particularly, since a lithium secondary battery is lightweight and has high energy density, the lithium secondary battery is in the spotlight as a driving power source for portable devices. Accordingly, research and development efforts for improving the performance of the lithium secondary battery have been actively conducted.

In the lithium secondary battery in a state in which an organic electrolyte solution or a polymer electrolyte solution is filled between a positive electrode and a negative electrode which are respectively formed of active materials capable of intercalating and deintercalating lithium ions, electrical energy is produced by oxidation and reduction reactions when the lithium ions are intercalated/deintercalated into/from the positive electrode and the negative electrode.

Lithium cobalt oxide ($LiCoO_2$), lithium nickel oxide ($LiNiO_2$), lithium manganese oxide ($LiMnO_2$ or $LiMn_2O_4$, etc.), or a lithium iron phosphate compound ($LiFePO_4$) has been used as a positive electrode active material of the lithium secondary battery. Also, as a method to improve low thermal stability while maintaining excellent reversible capacity of the lithium nickel oxide ($LiNiO_2$), a lithium composite metal oxide (hereinafter, simply referred to as 'NCM-based lithium composite transition metal oxide' or 'NCA-based lithium composite transition metal oxide'), in which a portion of nickel (Ni) is substituted with cobalt (Co) or manganese (Mn)/aluminum (Al), has been developed.

Also, in order to increase capacity per unit volume of the electrode, research has been conducted to increase rolling density by preparing a bimodal positive electrode active material layer through blending large particles and small particles. However, there is still a need to develop a positive electrode active material satisfying both high capacity and excellent thermal stability.

DISCLOSURE OF THE INVENTION

Technical Problem

An aspect of the present invention provides a positive electrode active material for a secondary battery having improved stability in which energy density is improved by using a positive electrode active material with large particles and small particles, occurrence of cracks and breakage of the positive electrode active material due to rolling are prevented, high-temperature life characteristics are improved, and an amount of gas generated during high-temperature storage is reduced.

Technical Solution

According to an aspect of the present invention, there is provided a positive electrode active material for a secondary battery which includes a first positive electrode active material and a second positive electrode active material, wherein an average particle diameter ($D_{50}$) of the first positive electrode active material is twice or more an average particle diameter ($D_{50}$) of the second positive electrode active material, and the second positive electrode active material has a crystallite size of 200 nm or more.

According to another aspect of the present invention, there is provided a method of preparing a positive electrode active material for a secondary battery which includes: after preparing a first positive electrode active material and a second positive electrode active material, mixing the first positive electrode active material and the second positive electrode active material, wherein an average particle diameter ($D_{50}$) of the first positive electrode active material is twice or more than an average particle diameter ($D_{50}$) of the second positive electrode active material, and the second positive electrode active material is prepared by over-sintering such that a crystallite size becomes 200 nm or more.

According to another aspect of the present invention, there is provided a positive electrode and a lithium secondary battery which include the positive electrode active material.

Advantageous Effects

According to the present invention, energy density may be improved by preparing a bimodal positive electrode active material through blending large particles and small particles, and, in this case, occurrence of cracks and breakage of the positive electrode active material due to rolling may be prevented by using over-sintered small particles having a crystallite size of 200 nm or more. Accordingly, stability may be improved, for example, capacity characteristics and high-temperature life characteristics of a secondary battery may be improved, and an amount of gas generated during high-temperature storage is reduced.

MODE FOR CARRYING OUT THE INVENTION

Hereinafter, the present invention will be described in more detail to allow for a clearer understanding of the present invention. In this case, it will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

<Positive Electrode Active Material>

A positive electrode active material for a secondary battery of the present invention includes a first positive electrode active material and a second positive electrode active material, wherein an average particle diameter ($D_{50}$) of the first positive electrode active material is twice or more than an average particle diameter ($D_{50}$) of the second positive electrode active material, and the second positive electrode active material has a crystallite size of 200 nm or more.

The positive electrode active material for a secondary battery of the present invention includes the first positive electrode active material, as large particles, and the second positive electrode active material as small particles.

In order to improve capacity per volume of a positive electrode for a secondary battery, it is necessary to increase density of a positive electrode active material layer, wherein a method of increasing rolling density (or electrode density) by reducing voids between positive electrode active material particles is used as a method of increasing the density of the positive electrode active material layer. With respect to the bimodal positive electrode active material in which large and small positive electrode active material particles are mixed as in the present invention, since a space between the large positive electrode active material particles may be filled with the small positive electrode active material particles, denser filling may be possible and energy density of the positive electrode may be increased.

The average particle diameter ($D_{50}$) of the first positive electrode active material is twice or more the average particle diameter ($D_{50}$) of the second positive electrode active material.

In the present invention, the average particle diameters ($D_{50}$) may be defined as a particle diameter at a cumulative volume of 50% in a particle size distribution curve. The average particle diameters ($D_{50}$), for example, may be measured by using a laser diffraction method. For example, in a method of measuring the average particle diameter ($D_{50}$) of the positive electrode active material, after the particles of the positive electrode active material are dispersed in a dispersion medium, the dispersion medium is introduced into a commercial laser diffraction particle size measurement instrument (e.g., Microtrac MT 3000) and irradiated with ultrasonic waves having a frequency of about 28 kHz and an output of 60 W, and the average particle diameter ($D_{50}$) at the cumulative volume of 50% may then be calculated by the measurement instrument.

Specifically, a ratio of the average particle diameter ($D_{50}$) of the first positive electrode active material to the average particle diameter ($D_{50}$) of the second positive electrode active material may be in a range of 2:1 to 8:1, and preferably, the ratio of the average particle diameter ($D_{50}$) of the first positive electrode active material to the average particle diameter ($D_{50}$) of the second positive electrode active material may be in a range of 2:1 to 4:1. Since the ratio of the average particle diameter ($D_{50}$) of the first positive electrode active material to the average particle diameter ($D_{50}$) of the second positive electrode active material satisfies the above range, voids between the positive electrode active material particles may be more effectively reduced, packing density may be increased, and positive electrode density may be improved to effectively improve capacity per volume of a positive electrode.

Specifically, the first positive electrode active material may have an average particle diameter ($D_{50}$) of 8 μm to 30 μm, preferably 9 μm to 25 μm, and more preferably 10 μm to 22 μm.

The second positive electrode active material may have an average particle diameter ($D_{50}$) of 9 μm or less, preferably 1 μm to 9 μm, and more preferably 2 μm to 8 μm.

The second positive electrode active material, as relatively smaller particles, are over-sintered so that a crystallite size is 200 nm or more. In a case in which the crystallite size of the second positive electrode active material is less than 200 nm, cracks and breakage of the positive electrode active material due to rolling occur, and high-temperature life characteristics and stability may be reduced. A method of over-sintering the second positive electrode active material is not particularly limited as long as it may increase the crystallite size to 200 nm or more, but, for example, the second positive electrode active material may be over-sintered at a temperature, which is about 50° C. higher than a sintering temperature of a typical positive electrode active material, in a sintering process. Preferably, the second positive electrode active material may have a crystallite size of 200 nm to 500 nm, for example, 200 nm to 400 nm.

In the present invention, the crystallite size may be defined as a single domain with an orientation in a primary particle. The crystallite size may be calculated from the Scherrer equation using X-ray diffraction (XRD) data.

The first positive electrode active material and the second positive electrode active material may each be a secondary particle which is formed by agglomeration of primary particles. In this case, since the second positive electrode active material, as relatively smaller particles, is over-sintered, an average particle diameter ($D_{50}$) of the primary particles may be 1 μm or more. In a case in which the average particle diameter ($D_{50}$) of the primary particles of the second positive electrode active material is less than 1 μm, the cracks and breakage of the positive electrode active material may occur due to the rolling, and the high-temperature life characteristics and stability may be reduced. Specifically, the second positive electrode active material may have an average particle diameter ($D_{50}$) of the primary particles of 1 μm to 8 μm, and more specifically, the second positive electrode active material may have an average particle diameter ($D_{50}$) of the primary particles of 1 μm to 6 μm. The first positive electrode active material, as relatively larger particles, may have an average particle diameter ($D_{50}$) of the primary particles of 100 nm to 3 μm.

The first positive electrode active material and second positive electrode active material of the present invention may each be a lithium composite transition metal oxide which includes at least two transition metals selected from the group consisting of nickel (Ni), cobalt (Co), and manganese (Mn).

According to an embodiment of the present invention, the first positive electrode active material and the second positive electrode active material may each be a lithium composite transition metal oxide which includes nickel (Ni) and cobalt (Co) and includes at least one selected from the group consisting of manganese (Mn) and aluminum (Al). For example, the first positive electrode active material and the second positive electrode active material may each be a NCM-based positive electrode active material including nickel (Ni), cobalt (Co), and manganese (Mn), or a NCA-based positive electrode active material including nickel (Ni), cobalt (Co), and aluminum (Al), and may each be a quaternary positive electrode active material which essentially includes four components of nickel (Ni), cobalt (Co), manganese (Mn), and aluminum (Al).

Also, the first positive electrode active material and second positive electrode active material according to the embodiment of the present invention may each be a high-Ni positive electrode active material in which an amount of the nickel (Ni) among total metallic elements contained in the lithium composite transition metal oxide is 60 mol % or more. Preferably, the amount of the nickel (Ni) among the total metallic elements may be 80 mol % or more. If the high-Ni first positive electrode active material and second positive electrode active material having an amount of the nickel (Ni) among the total metallic elements of 60 mol % or more are used as in the present invention, higher capacity may be secured.

The first positive electrode active material and the second positive electrode active material may be lithium composite transition metal oxides having the same composition, or may be lithium composite transition metal oxides having different compositions from each other.

Specifically, the first positive electrode active material and the second positive electrode active material may each independently a lithium composite transition metal oxide represented by Formula 1 below.

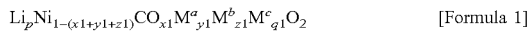

$$Li_p Ni_{1-(x1+y1+z1)} Co_{x1} M^a_{y1} M^b_{z1} M^c_{q1} O_2 \quad \text{[Formula 1]}$$

In Formula 1, $M^a$ is at least one element selected from the group consisting of Mn and Al, $M^b$ is at least one element selected from the group consisting of barium (Ba), calcium (Ca), zirconium (Zr), titanium (Ti), magnesium (Mg), tantalum (Ta), niobium (Nb), and molybdenum (Mo), $M^c$ is at least one element selected from the group consisting of Al, Zr, Ti, Mg, Ta, Nb, Mo, and chromium (Cr), and $0.9 \leq p \leq 1.5$, $0 < x1 \leq 0.4$, $0 < y1 \leq 0.4$, $0 \leq z1 \leq 0.1$, $0 \leq q1 \leq 0.1$, and $0 < x1+y1+z1 \leq 0.4$.

In the lithium composite transition metal oxide of Formula 1, lithium (Li) may be included in an amount corresponding to p, that is, $0.9 \leq p \leq 1.5$. When p is less than 0.9, capacity may be reduced, and, when p is greater than 1.5, since particles are sintered in a sintering process, the preparation of the positive electrode active material may be difficult. The Li may more preferably be included in an amount satisfying $1.0 \leq p \leq 1.15$, in consideration of balance between a significant capacity characteristics improvement effect of the positive electrode active material and sinterability during the preparation of the positive electrode active material due to the control of the amount of the Li.

In the lithium composite transition metal oxide of Formula 1, Ni may be included in an amount corresponding to $1-(x1+y1+z1)$, for example, $0.6 \leq 1-(x1+y1+z1) < 1$. If the amount of the Ni in the lithium composite transition metal oxide of Formula 1 is 0.6 or more, since the amount of Ni, which is sufficient to contribute to charge and discharge, is secured, high capacity may be achieved. The Ni may more preferably be included in an amount satisfying $0.8 \leq 1-(x1+y1+z1) \leq 0.99$.

In the lithium composite transition metal oxide of Formula 1, Co may be included in an amount corresponding to x1, that is, $0 < x1 \leq 0.4$. In a case in which the amount of the Co in the lithium composite transition metal oxide of Formula 1 is greater than 0.4, there is a concern that cost may increase. The Co may specifically be included in an amount satisfying $0.05 \leq x1 \leq 0.2$ in consideration of a significant capacity characteristics improvement effect due to the inclusion of the Co.

In the lithium composite transition metal oxide of Formula 1, $M^a$ may be Mn or Al, or Mn and Al, and these metallic elements may improve stability of the active material, and, as a result, may improve stability of the battery. In consideration of a life characteristics improvement effect, the $M^a$ may be included in an amount corresponding to y1, that is, $0 < y1 \leq 0.4$. If y1 in the lithium composite transition metal oxide of Formula 1 is greater than 0.4, there is a concern that output characteristics and capacity characteristics of the battery may be degraded, and the $M^a$ may specifically be included in an amount satisfying $0.05 \leq y1 \leq 0.2$.

In the lithium composite transition metal oxide of Formula 1, $M^b$ may be a doping element included in a crystal structure of the lithium composite transition metal oxide, wherein the $M^b$ may be included in an amount corresponding to z1, that is, $0 \leq z1 \leq 0.1$.

In the lithium composite transition metal oxide of Formula 1, metallic element of $M^c$ may not be included in the lithium composite transition metal oxide structure, and a lithium composite transition metal oxide, in which the surface of the lithium composite transition metal oxide is doped with the $M^c$, may be prepared by a method of mixing and sintering a $M^c$ source together when a precursor and a lithium source are mixed and sintered, or a method of forming a lithium composite transition metal oxide and then separately adding and sintering the $M^c$ source. The $M^c$ may be included in an amount corresponding to q1, that is, an amount that does not degrade characteristics of the positive electrode active material within a range of $0 \leq q1 \leq 0.1$.

In an embodiment of the present invention, the first positive electrode active material and the second positive electrode active material may be mixed in a weight ratio of 9:1 to 1:9, more preferably 8:2 to 3:7, and most preferably 8:2 to 5:5. Since the first positive electrode active material, as large particles, and the second positive electrode active material, as small particles with a crystallite size of 200 nm or more, are mixed within the above ratio range and used, energy density of the positive electrode may be increased, high capacity and excellent thermal stability may be secured, and the side reaction with the electrolyte solution may be suppressed. Accordingly, with respect to a lithium secondary battery prepared by using the above-described positive electrode active material, high capacity may be achieved, and battery characteristics, such as high-temperature life characteristics, may be improved.

<Method of Preparing Positive Electrode Active Material>

Next, a method of preparing the positive electrode active material of the present invention will be described.

The method of preparing the positive electrode active material of the present invention includes: after preparing a first positive electrode active material and a second positive electrode active material, mixing the first positive electrode active material and the second positive electrode active material, wherein an average particle diameter ($D_{50}$) of the first positive electrode active material is twice or more an average particle diameter ($D_{50}$) of the second positive electrode active material, and the second positive electrode active material is prepared by over-sintering such that a crystallite size becomes 200 nm or more.

As the first positive electrode active material, large particles having an average particle diameter ($D_{50}$) of 8 μm to 30 μm, preferably 9 μm to 25 μm, and more preferably 10 μm to 22 μm may be used.

As the second positive electrode active material, small particles having an average particle diameter ($D_{50}$) of 9 μm or less, preferably 1 μm to 9 μm, and more preferably 2 μm to 8 μm may be used.

In this case, since the second positive electrode active material, as relatively smaller particles, are prepared by over-sintering, a crystallite size is 200 nm or more. An over-sintering method is not particularly limited, but, for example, the over-sintering may be performed at a temperature, which is about 50° C. higher than about 800° C. to about 1,000° C., a sintering temperature range of a typical positive electrode active material. Preferably, the second positive electrode active material may be prepared by over-sintering such that the crystallite size becomes 200 nm to 500 nm, for example, 200 nm to 400 nm.

Also, the second positive electrode active material, as relatively smaller particles, may be prepared by over-sintering such that an average particle diameter ($D_{50}$) of primary particles becomes 1 μm or more. Specifically, the second positive electrode active material may be prepared by over-sintering such that the average particle diameter ($D_{50}$) of the primary particles becomes 1 μm to 8 μm, and more specifically, the second positive electrode active material may be prepared by over-sintering such that the average particle diameter ($D_{50}$) of the primary particles becomes 1 μm to 6 μm. The first positive electrode active material, as relatively larger particles, may have an average particle diameter ($D_{50}$) of primary particles of 100 nm to 3 μm.

In addition, since compositions and mixing ratio of the first positive electrode active material and the second positive electrode active material overlap with those of the positive electrode active material previously described, descriptions thereof will be omitted.

<Positive Electrode and Secondary Battery>

According to another embodiment of the present invention, provided are a positive electrode for a lithium secondary battery and a lithium secondary battery which include the above positive electrode active material.

Specifically, the positive electrode includes a positive electrode collector and a positive electrode active material layer which is disposed on the positive electrode collector and includes the positive electrode active material.

In the positive electrode, the positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 μm to 500 μm, and microscopic irregularities may be formed on the surface of the collector to improve the adhesion of the positive electrode active material. The positive electrode collector, for example, may be used in various shapes such as that of a film, a sheet, a foil, a net, a porous body, a foam body, a non-woven fabric body, and the like.

Also, the positive electrode active material layer may include a conductive agent and a binder in addition to the above-described positive electrode active material.

In this case, the conductive agent is used to provide conductivity to the electrode, wherein any conductive agent may be used without particular limitation as long as it has suitable electron conductivity without causing adverse chemical changes in the battery. Specific examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used. The conductive agent may be typically included in an amount of 1 wt % to 30 wt % based on a total weight of the positive electrode active material layer.

Furthermore, the binder improves the adhesion between the positive electrode active material particles and the adhesion between the positive electrode active material and the current collector. Specific examples of the binder may be polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluorine rubber, or various copolymers thereof, and any one thereof or a mixture of two or more thereof may be used. The binder may be included in an amount of 1 wt % to 30 wt % based on the total weight of the positive electrode active material layer.

The positive electrode may be prepared according to a typical method of preparing a positive electrode except that the above-described positive electrode active material is used. Specifically, a composition for forming a positive electrode active material layer, which includes the above-described positive electrode active material as well as selectively the binder and the conductive agent, is coated on the positive electrode collector, and the positive electrode may then be prepared by drying and rolling the coated positive electrode collector. In this case, types and amounts of the positive electrode active material, the binder, and the conductive are the same as those previously described.

The solvent may be a solvent normally used in the art. The solvent may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the solvent may dissolve or disperse the positive electrode active material, the conductive agent, and the binder in consideration of a coating thickness of a slurry and manufacturing yield, and may allow to have a viscosity that may provide excellent thickness uniformity during the subsequent coating for the preparation of the positive electrode.

Also, as another method, the positive electrode may be prepared by casting the composition for forming a positive electrode active material layer on a separate support and then laminating a film separated from the support on the positive electrode collector.

According to another embodiment of the present invention, an electrochemical device including the positive electrode is provided. The electrochemical device may specifically be a battery or a capacitor, and, for example, may be a lithium secondary battery.

The lithium secondary battery specifically includes a positive electrode, a negative electrode disposed to face the positive electrode, a separator disposed between the positive electrode and the negative electrode, and an electrolyte, wherein the positive electrode is as described above. Also, the lithium secondary battery may further selectively include a battery container accommodating an electrode assembly of the positive electrode, the negative electrode, and the separator, and a sealing member sealing the battery container.

In the lithium secondary battery, the negative electrode includes a negative electrode collector and a negative electrode active material layer disposed on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 μm to 500 μm, and, similar to the positive electrode collector, microscopic irregularities may be formed on the surface of the collector to improve the adhesion of a negative electrode active material. The negative electrode collector, for example, may be used in various shapes such as that of a film, a sheet, a foil, a net, a porous body, a foam body, a non-woven fabric body, and the like.

The negative electrode active material layer selectively includes a binder and a conductive agent in addition to the negative electrode active material. The negative electrode active material layer may be prepared by coating a composition for forming a negative electrode in the form of a slurry, which includes selectively the binder and the conductive agent as well as the negative electrode active material, on the negative electrode collector and drying the coated negative electrode collector, or may be prepared by casting the composition for forming a negative electrode on a separate support and then laminating a film separated from the support on the negative electrode collector.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_\beta$ ($0<\beta<2$), $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

Also, the binder and the conductive agent may be the same as those previously described in the positive electrode.

In the lithium secondary battery, the separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

Also, the electrolyte used in the present invention may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC) diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent may be used, and, for example, a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be used. In this case, the performance of the electrolyte solution may be excellent when the cyclic carbonate and the chain carbonate are mixed in a volume ratio of about 1:1 to about 1:9.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, $LiCl$, $LiI$, or $LiB(C_2O_4)_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

In order to improve lifetime characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further added to the electrolyte in addition to the electrolyte components. In this case, the additive may be included in an amount of 0.1 wt % to 5 wt % based on a total weight of the electrolyte.

As described above, since the lithium secondary battery including the positive electrode active material according to the present invention stably exhibits excellent discharge capacity, output characteristics, and capacity retention, the lithium secondary battery is suitable for portable devices, such as mobile phones, notebook computers, and digital cameras, and electric cars such as hybrid electric vehicles (HEVs).

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

Hereinafter, examples of the present invention will be described in detail in such a manner that it may easily be carried out by a person with ordinary skill in the art to which the present invention pertains. The invention may, however, be embodied in many different forms and should not be construed as being limited to the examples set forth herein.

Example 1

Particles ($D_{50}$=14 μm) of $LiNi_{0.88}Co_{0.10}Mn_{0.02}O_2$ were prepared as a first positive electrode active material, and particles ($D_{50}$=5 μm) of $LiNi_{0.8}Co_{0.1}Mn_{0.1}O_2$ were prepared as a second positive electrode active material. In this case, the first positive electrode active material was not over-sintered and had a crystallite size of 145 nm, and the second positive electrode active material was over-sintered and had a crystallite size of 230 nm and an average particle diameter ($D_{50}$) of primary particles of 2 μm. The first positive electrode active material and the second positive electrode active material were mixed in a weight ratio of 8:2 to prepare a positive electrode active material.

Example 2

Particles ($D_{50}$=15 μm) of $LiNi_{0.87}Co_{0.08}Mn_{0.03}Al_{0.02}O_2$ were prepared as a first positive electrode active material, and particles ($D_{50}$=6 μm) of $LiNi_{0.8}Co_{0.1}Mn_{0.1}O_2$ were prepared as a second positive electrode active material. In this case, the first positive electrode active material was not over-sintered and had a crystallite size of 140 nm, and the second positive electrode active material was over-sintered and had a crystallite size of 260 nm and an average particle diameter ($D_{50}$) of primary particles of 2 μm. The first positive electrode active material and the second positive electrode active material were mixed in a weight ratio of 7:3 to prepare a positive electrode active material.

Comparative Example 1

Particles ($D_{50}$=14 μm) of $LiNi_{0.88}Co_{0.10}Mn_{0.0202}$ were prepared as a first positive electrode active material, and particles ($D_{50}$=5 μm) of $LiNi_{0.8}Co_{0.1}Mn_{0.1}O_2$ were prepared as a second positive electrode active material. A positive electrode active material was prepared in the same manner as in Example 1 except that, in this case, the first positive electrode active material and the second positive electrode active material were not over-sintered, wherein the first positive electrode active material had a crystallite size of 145 nm, and the second positive electrode active material having a crystallite size of 130 nm and an average particle diameter ($D_{50}$) of primary particles of 0.5 μm was used.

Comparative Example 2

A positive electrode active material was prepared by using monomodal particles ($D_{50}$=14 μm) of $LiNi_{0.88}Co_{0.10}Mn_{0.02}O_2$.

[Experimental Example 1: Rolling Density Evaluation]

Rolling densities of the positive electrode active materials prepared in Examples 1 and 2 and Comparative Examples 1 and 2 were evaluated, and the results thereof are presented in Table 1.

With respect to the rolling density, after 5 g of each of the positive electrode active materials prepared in Examples 1 and 2 and Comparative Examples 1 and 2 was subdivided and filled into a cylindrical holder without a gap, density of each powder was measured at 2,000 kgf when a pressure was applied by increasing the pressure from 400 kgf to 2,000 kgf with an increment of 400 kgf.

TABLE 1

| | Example 1 | Example 2 | Comparative Example 1 | Comparative Example 2 |
|---|---|---|---|---|
| Rolling density (g/cm³) | 3.1 | 3.2 | 3.0 | 2.8 |

Referring to Table 1, rolling densities of Examples 1 and 2, in which the first positive electrode active material, as large particles, and the second positive electrode active material, as small particles with a crystallite size of 200 nm or more, were mixed and used, were improved in comparison to that of Comparative Example 2 in which the monomodal positive electrode active material was used.

[Experimental Example 2: Particle Breakage Evaluation]

A degree of particle breakage was evaluated when each of the positive electrode active materials prepared in Examples 1 and 2 and Comparative Examples 1 and 2 was rolled at 2,000 kgf in the same manner as in Experimental Example 1. The degree of particle breakage was observed by a scanning electron microscope (SEM), specifically, the degree of particle breakage was calculated from changes in $D_{50}$ in a particle size distribution (PSD), and the results thereof are presented in Table 2.

TABLE 2

| | Example 1 | Example 2 | Comparative Example 1 | Comparative Example 2 |
|---|---|---|---|---|
| Particle breakage (%) | 3.9 | 4.2 | 8.3 | 21.4 |

Referring to Table 2, with respect to Examples 1 and 2, although bimodal powders composed of the large particles and the small particles were used, it may be confirmed that the degrees of particle breakage were significantly reduced in comparison to that of Comparative Example 1 in which the small particles having a crystallite size of less than 200 nm was used. Also, with respect to Examples 1 and 2, the degrees of particle breakage were more significantly reduced than that of Comparative Example 2 in which the monomodal positive electrode active material was used.

[Experimental Example 3: High-Temperature Life Characteristics Evaluation]

Each of the positive electrode active materials prepared in Examples 1 and 2 and Comparative Examples 1 and 2, a carbon black conductive agent, and a PVdF binder were mixed in an N-methylpyrrolidone solvent at a weight ratio of 96.5:1.5:2 to prepare a positive electrode material mixture (viscosity: 5,000 mPa·s), and one surface of an aluminum current collector was coated with the positive electrode material mixture, dried at 130° C., and then rolled to prepare a positive electrode. Lithium metal was used as a negative electrode.

Each lithium secondary battery was prepared by preparing an electrode assembly by disposing a porous polyethylene separator between the positive electrode and negative electrode prepared as described above, disposing the electrode assembly in a case, and then injecting an electrolyte solution into the case. In this case, the electrolyte solution was prepared by dissolving 1.0 M lithium hexafluorophosphate (LiPF$_6$) in an organic solvent composed of ethylene carbonate/dimethyl carbonate/ethylmethyl carbonate (mixing volume ratio of EC/DMC/EMC=3/4/3).

Each of the lithium secondary battery half cells prepared by using each of the positive electrode active materials prepared in Examples 1 and 2 and Comparative Examples 1 and 2 was charged at 0.5 C to a voltage of 4.25 V in a constant current/constant voltage (CC/CV) mode at 45° C. (termination current of 1/20 C), and discharged at a constant current of 0.5 C to a voltage of 2.5 V to measure capacity retention when 100 cycles of charge and discharge were performed and thus, high-temperature life characteristics were evaluated. The results thereof are presented in Table 3.

TABLE 3

|  | Initial capacity (mAh/g) | Capacity retention (%) (@ 100 cycles) |
| --- | --- | --- |
| Example 1 | 201 | 78 |
| Example 2 | 200 | 76 |
| Comparative Example 1 | 202 | 60 |
| Comparative Example 2 | 198 | 57 |

Referring to Table 3, with respect to Examples 1 and 2, although bimodal powders composed of the large particles and the small particles were used, it may be confirmed that the high-temperature life characteristics were significantly improved in comparison to those of Comparative Example 1 in which the small particles having a crystallite size of less than 200 nm was used. Also, with respect to Examples 1 and 2, the high-temperature life characteristics were more significantly improved than those of Comparative Example 2 in which the monomodal positive electrode active material was used.

[Experimental Example 4: High-Temperature Storage Characteristics Evaluation]

Each of the lithium secondary battery half cells prepared by using each of the positive electrode active materials prepared in Examples 1 and 2 and Comparative Examples 1 and 2 as in Experimental Example 3 was stored at 60° C. for 2 weeks at a state of charge (SOC) of 100% to measure an amount of gas generated, and the results thereof are presented in Table 4.

TABLE 4

|  | Amount of gas generated (μl) |
| --- | --- |
| Example 1 | 78 |
| Example 2 | 76 |
| Comparative Example 1 | 110 |
| Comparative Example 2 | 125 |

Referring to Table 4, with respect to Examples 1 and 2, although bimodal powders composed of the large particles and the small particles were used, it may be confirmed that the amounts of gas generated during high-temperature storage were significantly reduced in comparison to that of Comparative Example 1 in which the small particles having a crystallite size of less than 200 nm was used. Also, with respect to Examples 1 and 2, the amount of gas generated during high-temperature storage was more significantly reduced than that of Comparative Example 2 in which the monomodal positive electrode active material was used.

The invention claimed is:

1. A positive electrode active material for a secondary battery, the positive electrode active material comprising:
   a first positive electrode active material and a second positive electrode active material,
   wherein an average particle diameter ($D_{50}$) of the first positive electrode active material is twice or more an average particle diameter ($D_{50}$) of the second positive electrode active material, and
   the second positive electrode active material has a crystallite size of 200 nm or more.

2. The positive electrode active material of claim 1, wherein the second positive electrode active material is a secondary particle formed by agglomeration of primary particles, and an average particle diameter ($D_{50}$) of the primary particles of the second positive electrode active material is 1 μm or more.

3. The positive electrode active material of claim 2, wherein the average particle diameter ($D_{50}$) of the primary particles of the second positive electrode active material is from 1 μm to 8 μm.

4. The positive electrode active material of claim 1, wherein the second positive electrode active material has an average particle diameter ($D_{50}$) of 9 μm or less.

5. The positive electrode active material of claim 4, wherein the average particle diameter ($D_{50}$) of the second positive electrode active material is from 1 μm to 9 μm.

6. The positive electrode active material of claim 1, wherein the first positive electrode active material has an average particle diameter ($D_{50}$) of 8 μm to 30 μm.

7. The positive electrode active material of claim 1, wherein the first positive electrode active material and the second positive electrode active material are lithium composite transition metal oxides having the same composition or are lithium composite transition metal oxides having different compositions from each other.

8. The positive electrode active material of claim 1, wherein the first positive electrode active material and the second positive electrode active material are each independently represented by Formula 1:

$$Li_pNi_{1-(x1+y1+z1)}Co_{x1}M^a_{y1}M^b_{z1}M^c_{q1}O_2 \qquad \text{[Formula 1]}$$

wherein, in Formula 1, $M^a$ is at least one element selected from the group consisting of manganese (Mn) and aluminum (Al), $M^b$ is at least one element selected from the group consisting of barium (Ba), calcium (Ca), zirconium (Zr), titanium (Ti), magnesium (Mg), tantalum (Ta), niobium (Nb), and molybdenum (Mo), $M^c$ is at least one element selected from the group consisting of Al, Zr, Ti, Mg, Ta, Nb, Mo, and chromium (Cr), and $0.9 \leq p \leq 1.5$, $0 < x1 \leq 0.4$, $0 < y1 \leq 0.4$, $0 \leq z1 \leq 0.1$, $0 \leq q1 \leq 0.1$, and $0 < x1+y1+z1 \leq 0.4$.

9. The positive electrode active material of claim 1, wherein the first positive electrode active material and the second positive electrode active material are mixed in a weight ratio of 9:1 to 1:9.

10. The positive electrode active material of claim 1, wherein the crystallite size of the second positive electrode active material is from 200 nm to 500 nm.

11. The positive electrode active material of claim 1, wherein the first positive electrode active material is a secondary particle formed by agglomeration of primary particles, and an average particle diameter ($D_{50}$) of the primary particles of the first positive electrode active material is 100 nm to 3 μm.

12. A positive electrode for a secondary battery, the positive electrode comprising the positive electrode active material of claim 1.

13. A lithium secondary battery comprising the positive electrode of claim 12.

14. A method of preparing the positive electrode active material for a secondary battery of claim 1, the method comprising:
mixing the first positive electrode active material and the second positive electrode active material to form a positive electrode active material having a bimodal particle size distribution,
wherein an average particle diameter ($D_{50}$) of the first positive electrode active material is twice or more an average particle diameter ($D_{50}$) of the second positive electrode active material.

15. The method of claim 14, wherein the second positive electrode active material is a secondary particle formed by agglomeration of primary particles, and an average particle diameter ($D_{50}$) of the primary particles of the second positive electrode active material is 1 μm or more.

16. The method of claim 14, wherein the second positive electrode active material has an average particle diameter ($D_{50}$) of 9 μm or less.

17. The method of claim 14, wherein the first positive electrode active material has an average particle diameter ($D_{50}$) of 8 μm to 30 μm.

18. The method of claim 14, wherein the first positive electrode active material and the second positive electrode active material are each independently represented by Formula 1:

$$Li_pNi_{1-(x1+y1+z1)}Co_{x1}M^a_{y1}M^b_{z1}M^c_{q1}O_2 \qquad \text{[Formula 1]}$$

wherein, in the Formula 1, $M^a$ is at least one element selected from the group consisting of manganese (Mn) and aluminum (Al), $M^b$ is at least one element selected from the group consisting of barium (Ba), calcium (Ca), zirconium (Zr), titanium (Ti), magnesium (Mg), tantalum (Ta), niobium (Nb), and molybdenum (Mo), $M^c$ is at least one element selected from the group consisting of Al, Zr, Ti, Mg, Ta, Nb, Mo, and chromium (Cr), and $0.9 \le p \le 1.5$, $0 < x1 \le 0.4$, $0 < y1 \le 0.4$, $0 \le z1 \le 0.1$, $0 \le q1 \le 0.1$, and $0 < x1+y1+z1 \le 0.4$.

19. The method of claim 14, wherein the first positive electrode active material and the second positive electrode active material are mixed in a weight ratio of 9:1 to 1:9.

20. The method of claim 14, wherein the second positive electrode active material is prepared by over-sintering such that the crystallite size becomes 200 nm or more.

* * * * *

UNITED STATES PATENT AND TRADEMARK OFFICE
CERTIFICATE OF CORRECTION

| | | |
|---|---|---|
| PATENT NO. | : 11,515,522 B2 | Page 1 of 1 |
| APPLICATION NO. | : 16/770820 | |
| DATED | : November 29, 2022 | |
| INVENTOR(S) | : Dong Hun Lee et al. | |

It is certified that error appears in the above-identified patent and that said Letters Patent is hereby corrected as shown below:

On the Title Page

Item (30) Foreign Application Priority Data:
Change "Feb. 1, 2019" to --Feb. 1, 2018--

Signed and Sealed this
Seventh Day of February, 2023

Katherine Kelly Vidal
*Director of the United States Patent and Trademark Office*